(12) United States Patent
Ewen et al.

(10) Patent No.: US 12,023,615 B1
(45) Date of Patent: Jul. 2, 2024

(54) CARTRIDGE FILTER CLEANING SYSTEM AND METHOD

(71) Applicant: Filter Preaux, LLC, Baton Rouge, LA (US)

(72) Inventors: Earl L. Ewen, Prairieville, LA (US); Kenneth W. Jones, Baton Rouge, LA (US)

(73) Assignee: Filter Preaux, LLC, Baton Rouge, LA (US)

( * ) Notice: Subject to any disclaimer, the term of this patent is extended or adjusted under 35 U.S.C. 154(b) by 0 days.

(21) Appl. No.: 18/506,956

(22) Filed: Nov. 10, 2023

(51) Int. Cl.
*B01D 41/04* (2006.01)
*B08B 3/02* (2006.01)
*B08B 13/00* (2006.01)

(52) U.S. Cl.
CPC ............. *B01D 41/04* (2013.01); *B08B 3/022* (2013.01); *B08B 13/00* (2013.01); *B08B 2203/0211* (2013.01)

(58) Field of Classification Search
CPC ......... B01D 41/04; B08B 3/022; B08B 13/00; B08B 2203/0211
See application file for complete search history.

(56) References Cited

U.S. PATENT DOCUMENTS

| | | | | |
|---|---|---|---|---|
| 3,021,972 A | * | 2/1962 | Everroad | B01D 41/04 414/433 |
| 3,604,437 A | * | 9/1971 | Tappan, Jr. | F02M 35/08 134/167 R |
| 3,650,283 A | * | 3/1972 | Lang | B01D 41/04 134/143 |
| 4,299,245 A | * | 11/1981 | Clapper | B08B 3/02 134/140 |
| 4,842,624 A | * | 6/1989 | Barton | B01D 41/04 55/293 |
| 5,135,580 A | * | 8/1992 | Cantrell | B08B 9/0826 134/152 |
| 5,305,493 A | * | 4/1994 | Prenn | F02M 35/086 15/345 |
| 5,384,045 A | * | 1/1995 | Chmielewski | B01D 29/74 134/55 |
| 5,584,900 A | * | 12/1996 | Zaiser | B01D 46/24 55/303 |

(Continued)

FOREIGN PATENT DOCUMENTS

| | | | | |
|---|---|---|---|---|
| GB | 2304600 A | * | 3/1997 | ............. B01D 41/04 |
| WO | WO-2008022376 A1 | * | 2/2008 | ............. B01D 41/04 |

*Primary Examiner* — Benjamin L Osterhout
(74) *Attorney, Agent, or Firm* — Booth Udall Fuller PLC; Kenneth C. Booth

(57) ABSTRACT

A filter cleaning system with a cleaning chamber. The cleaning chamber has a container, a plurality of shafts and a plurality of nozzles inside of the container, and an outlet. The shafts extend along a length of the cleaning chamber and are configured to support a cylindrical filter. Each of the shafts is rotatable with respect to the chamber and is configured to cause the filter to rotate about an axis of the filter. The nozzles are positioned below the shafts and are configured to spray water upward toward a gap between the shafts. Each nozzle has a spray pattern comprising a flat fan pattern with a centerline. Each nozzle is oriented such that the centerline is nonparallel with the axis of the filter. The outlet is configured to drain recovery water out of the interior of the cleaning chamber.

20 Claims, 8 Drawing Sheets

(56) References Cited

U.S. PATENT DOCUMENTS

| | | | | |
|---|---|---|---|---|
| 6,156,213 | A * | 12/2000 | Dudley | B01D 41/04 210/791 |
| 9,675,910 | B1 * | 6/2017 | Wade | B01D 41/04 |
| 2002/0166578 | A1 * | 11/2002 | Leblond | B01D 41/04 134/140 |
| 2004/0200770 | A1 * | 10/2004 | Clary | B01D 35/157 210/402 |
| 2007/0246087 | A1 * | 10/2007 | Crawford | B08B 9/023 134/198 |
| 2008/0006290 | A1 * | 1/2008 | Yamanaka | B01D 41/04 134/32 |
| 2022/0193590 | A1 * | 6/2022 | Szczap | B08B 9/0321 |

* cited by examiner

CARTRIDGE FILTER CLEANING SYSTEM AND METHOD

TECHNICAL FIELD

This document relates to filter cleaning systems and more specifically to systems for cleaning a cartridge filter.

BACKGROUND

Filters are used worldwide to help maintain water systems including commercial and residential swimming pools. In many filtration systems, including those used for most residential swimming pools, hot tubs and spas, and some commercial swimming pools, cartridge filters are used, and they must be periodically cleaned or replaced. These cartridge filters are difficult and time-consuming to clean using conventional methods and equipment.

SUMMARY

Aspects of this document relate to a filter cleaning system comprising a cleaning chamber having a container with a door hingedly coupled to the container, the container and the door together defining an interior of the cleaning chamber, a plurality of shafts in the interior of the cleaning chamber, extending along a length of the cleaning chamber, and configured to support a cylindrical filter, wherein each shaft of the plurality of shafts is rotatable with respect to the cleaning chamber and configured to cause the filter to rotate about an axis of the filter, a plurality of nozzles positioned below the plurality of shafts in the interior of the cleaning chamber and configured to spray water upward toward a gap between the plurality of shafts, wherein each nozzle has a spray pattern comprising a flat fan pattern with a centerline, wherein each nozzle is oriented such that the centerline is nonparallel with the axis of the filter when the filter is positioned on the plurality of shafts, and wherein each nozzle of the plurality of nozzles is individually closeable, and an outlet adjacent to a bottom of the cleaning chamber below the plurality of nozzles in the interior of the cleaning chamber, the outlet configured to drain recovery water out of the interior of the cleaning chamber, a drive system positioned outside of the cleaning chamber, the drive system having a drive motor operably coupled to and configured to rotate at least one shaft of the plurality of shafts, a water holding tank fluidly coupled to the plurality of nozzles, a pump configured to supply water to the plurality of nozzles from the water holding tank, and a discharge water filter fluidly coupled to the outlet of the cleaning chamber and configured to filter and discharge the recovery water from the filter cleaning system.

Particular embodiments may comprise one or more of the following features. The spray pattern of each nozzle of the plurality of nozzles may overlap with the spray pattern of an adjacent nozzle of the plurality of nozzles. When the filter is positioned on the plurality of shafts, an angle between the axis of the filter and the centerline of the spray pattern of each nozzle may be between 5 degrees and 10 degrees. The drive motor may be configured to rotate the at least one shaft of the plurality of shafts in a first direction and in a second direction opposite the first direction.

Aspects of this document relate to a filter cleaning system comprising a cleaning chamber, the cleaning chamber having a container defining an interior of the cleaning chamber, a plurality of shafts in the interior of the cleaning chamber, extending along a length of the cleaning chamber, and configured to support a filter, wherein each shaft of the plurality of shafts is rotatable with respect to the cleaning chamber and configured to cause the filter to rotate about an axis of the filter, a plurality of nozzles positioned below the plurality of shafts in the interior of the cleaning chamber and configured to spray water upward toward a gap between the plurality of shafts, wherein each nozzle has a spray pattern comprising a flat fan pattern with a centerline and wherein each nozzle is oriented such that the centerline is nonparallel with the axis of the filter when the filter is positioned on the plurality of shafts, and an outlet adjacent to a bottom of the cleaning chamber below the plurality of nozzles in the interior of the cleaning chamber, the outlet configured to drain recovery water out of the interior of the cleaning chamber.

Particular embodiments may comprise one or more of the following features. Each nozzle of the plurality of nozzles may be individually closeable. The filter cleaning system may comprise a drive system positioned outside of the cleaning chamber, the drive system having a drive motor operably coupled to and configured to rotate at least one shaft of the plurality of shafts in a first direction and in a second direction opposite the first direction. The filter cleaning system may comprise a water holding tank fluidly coupled to the plurality of nozzles and a pump configured to supply water to the plurality of nozzles from the water holding tank at a water pressure of at least 80 pounds per square inch. When the filter is positioned on the plurality of shafts, an angle between the axis of the filter and the centerline of the spray pattern of each nozzle may be between 5 degrees and 10 degrees. The spray pattern of each nozzle of the plurality of nozzles may have a spread of at least 100 degrees along the centerline.

Aspects of this document relate to a filter cleaning system comprising a plurality of shafts configured to support a filter, wherein each shaft of the plurality of shafts is rotatable and is configured to cause the filter to rotate about an axis of the filter, and a plurality of nozzles positioned below the plurality of shafts and configured to spray water upward toward a gap between the plurality of shafts, wherein each nozzle has a spray pattern configured to open each pleat of a plurality of pleats of the filter as the filter rotates about the axis of the filter.

Particular embodiments may comprise one or more of the following features. The filter cleaning system may further comprise a cleaning chamber having a container and a door coupled to the container, wherein the plurality of shafts and the plurality of nozzles are positioned within an interior of the cleaning chamber defined by the container and the door. The filter cleaning system may further comprise a filter fluidly coupled to an outlet of the cleaning chamber and configured to filter and discharge the recovery water from the filter cleaning system. Each nozzle of the plurality of nozzles may be individually closeable. The filter cleaning system may further comprise a drive system having a drive motor operably coupled to and configured to rotate at least one shaft of the plurality of shafts. The drive motor may be configured to rotate the at least one shaft of the plurality of shafts in a first direction and in a second direction opposite the first direction. The spray pattern of each nozzle of the plurality of nozzles may overlap with the spray pattern of an adjacent nozzle of the plurality of nozzles. The spray pattern of each nozzle may comprise a flat fan pattern with a centerline. Each nozzle may be oriented such that the centerline is nonparallel with the axis of the filter when the filter is positioned on the plurality of shafts. When the filter is positioned on the plurality of shafts, an angle between the axis of the filter and the centerline of the spray pattern of each nozzle may be between 5 degrees and 10 degrees.

The foregoing and other aspects, features, and advantages will be apparent from the specification, drawings, and the claims.

BRIEF DESCRIPTION OF THE DRAWINGS

Implementations will hereinafter be described in conjunction with the appended drawings, where like designations denote like elements, and.

Figure 1:
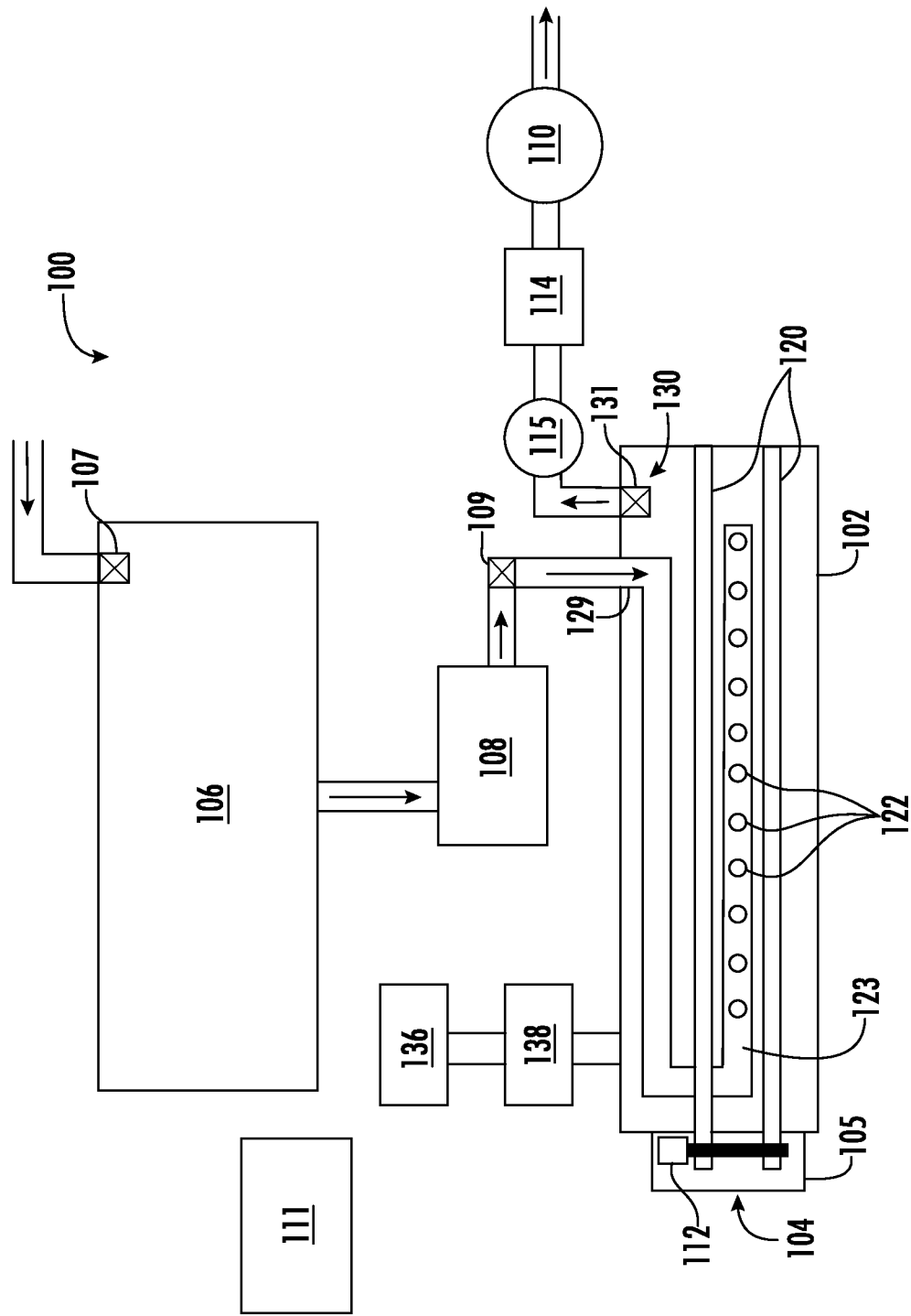
FIG. 1 is a system diagram of a filter cleaning system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

Detailed aspects and applications of the disclosure are described below in the following drawings and detailed description of the technology. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the disclosure. It will be understood, however, by those skilled in the relevant arts, that embodiments of the technology disclosed herein may be practiced without these specific details. It should be noted that there are many different and alternative configurations, devices and technologies to which the disclosed technologies may be applied. The full scope of the technology disclosed herein is not limited to the examples that are described below.

The singular forms "a," "an," and "the" include plural referents unless the context clearly dictates otherwise. Thus, for example, reference to "a step" includes reference to one or more of such steps.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

Throughout the description and claims of this specification, the words "comprise" and "contain" and variations of the words, for example "comprising" and "comprises", mean "including but not limited to", and are not intended to (and do not) exclude other components.

As required, detailed embodiments of the present disclosure are included herein. It is to be understood that the disclosed embodiments are merely exemplary of the invention that may be embodied in various forms. Therefore, specific structural and functional details disclosed herein are not to be interpreted as limits, but merely as a basis for teaching one skilled in the art to employ the present invention. The specific examples below will enable the disclosure to be better understood. However, they are given merely by way of guidance and do not imply any limitation.

The present disclosure may be understood more readily by reference to the following detailed description taken in connection with the accompanying figures and examples, which form a part of this disclosure. It is to be understood that this disclosure is not limited to the specific materials, devices, methods, applications, conditions, or parameters described and/or shown herein, and that the terminology used herein is for the purpose of describing particular embodiments by way of example only and is not intended to be limiting of the claimed inventions. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

More specifically, this disclosure, its aspects and embodiments, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The present disclosure is related to a filter cleaning system 100. The cleaning system 100 is configured to automate and speed up the process of cleaning filters, and especially cartridge filters 10. The present disclosure is also related to a method of cleaning cartridge filters 10, discussed in more detail below.

As illustrated in FIG. 1, the filter cleaning system 100 may comprise a cleaning chamber 102, a drive system 104, a water holding tank 106, a pump 108, and/or a discharge water filter 110. The filter cleaning system 100 may also comprise a system motor 111 and a filter pump 114, where the filter pump 114 is specifically associated with the discharge water filter 110. The drive system 104 is housed in a control box 105, which may be positioned outside of the cleaning chamber 102 and aligned with a length of the cleaning chamber 102. This allows the drive system 104 to cause the filter 10 to rotate when the filter 10 is placed inside of the cleaning chamber 102, as discussed in more detail below. The drive system 104 may have a drive motor 112 for this purpose.

The water holding tank 106 is configured to supply water to the cleaning chamber 102 to clean the filter 10. Thus, as shown in FIG. 1, the water holding tank 106 may be fluidly coupled to the cleaning chamber 102 through the pump 108. In such an embodiment, the pump 108 is thus configured to supply water to the cleaning chamber 102 from the water holding tank 106. The water holding tank 106 may be filled using any water source and may continue being filled during operation. A float valve 107 may be used to allow water into the water holding tank 106 when the water level in the water holding tank 106 begins to lower. In some embodiments, a garden hose may be used to maintain the supply of water for the cleaning system 100. The system motor 111 may be configured to provide electricity or to create a mechanical driver using any method known in the art, and the drive system 104, the pump 108, the drive motor 112, the filter pump 114, the float switch 131, and the chemical pump 138 may all be powered by the system motor 111. For example, the system motor 111 may be gas-powered, battery-powered, or may have a power cord for connecting to another power source, such as an electrical power source.

In some embodiments, the pump 108 is configured to supply water from the water holding tank 106 to the cleaning chamber 102 through an in-line check valve 109. The check valve 109 is configured to prevent water from gravity feeding from the water holding tank 106 to the cleaning chamber 102 when the pump 108 is not operating. Thus, when the pump 108 is turned on and pumps water to the cleaning chamber 102, the check valve 109 allows the water to pass through, but once the pump 108 is turned off, the check valve 109 is configured to limit water flow through the check valve 109 so that water does not continuously drain from the water holding tank 106 through the pump 108 and the cleaning chamber 102.

If the user is cleaning multiple filters 10, the user can stop water flow into the cleaning chamber 102 by turning off the pump 108. The pump 108 and the filter pump 114 may be operated from an electromagnetic clutch driven by the motor 111. In some embodiments, the control box 105 may also include switches 140 to control the pump 108 and/or the filter pump 114, as described in more detail below. Using these switches 140, the user can opt to resume water flow into and out of the cleaning chamber 102.

The discharge water filter 110 is configured to receive recovery water from the cleaning chamber 102 and filter and discharge the recovery water from the cleaning system 100. The filter pump 114 may be operably coupled to a strainer basket assembly 115 and the discharge water filter 110 to drain the recovery water from the cleaning chamber 102 and pump the recovery water through the strainer basket assembly 115 and the discharge water filter 110. In some embodiments, the filter pump 114 is positioned between the strainer basket assembly 115 and the discharge water filter 110 (see FIG. 1). This allows larger particles and solid material to be removed from the recovery water before the recovery water enters the filter pump 114. Because the recovery water is dirty, it is not desirable to discard the recovery water without filtering, but it is also desirable to leave the water behind because eliminating previously used water avoids the potential for cross contamination to other circulation and filtration systems. The strainer basket assembly 115 and the discharge water filter 110 allow the recovery water to be discarded by removing a portion of the solids from the recovery water. In practice, the recovery water may be discarded into any form of subsurface drainage. A garden hose or other tubing or pipe may be used to drain the recover water from the water filter 110 to the subsurface drainage.

Turning to FIGS. 2-5, the cleaning system 100, including all of the components discussed herein, may be mounted on a skid 113. The skid 113 may be metal, may have a mesh construction and may be sized to fit all of the components of the cleaning system 100 thereon. Each of the components of the cleaning system 100 may be bolted to the skid 113, and the skid 113 may be configured to slidably couple with tracks. This allows the skid 113 to be easily slid out of a transportation surface, such as a truck bed or a trailer, and makes the cleaning system 100 more transportable. The skid 113 may be configured to facilitate loading and unloading of the cleaning system 100.

Figure 2:
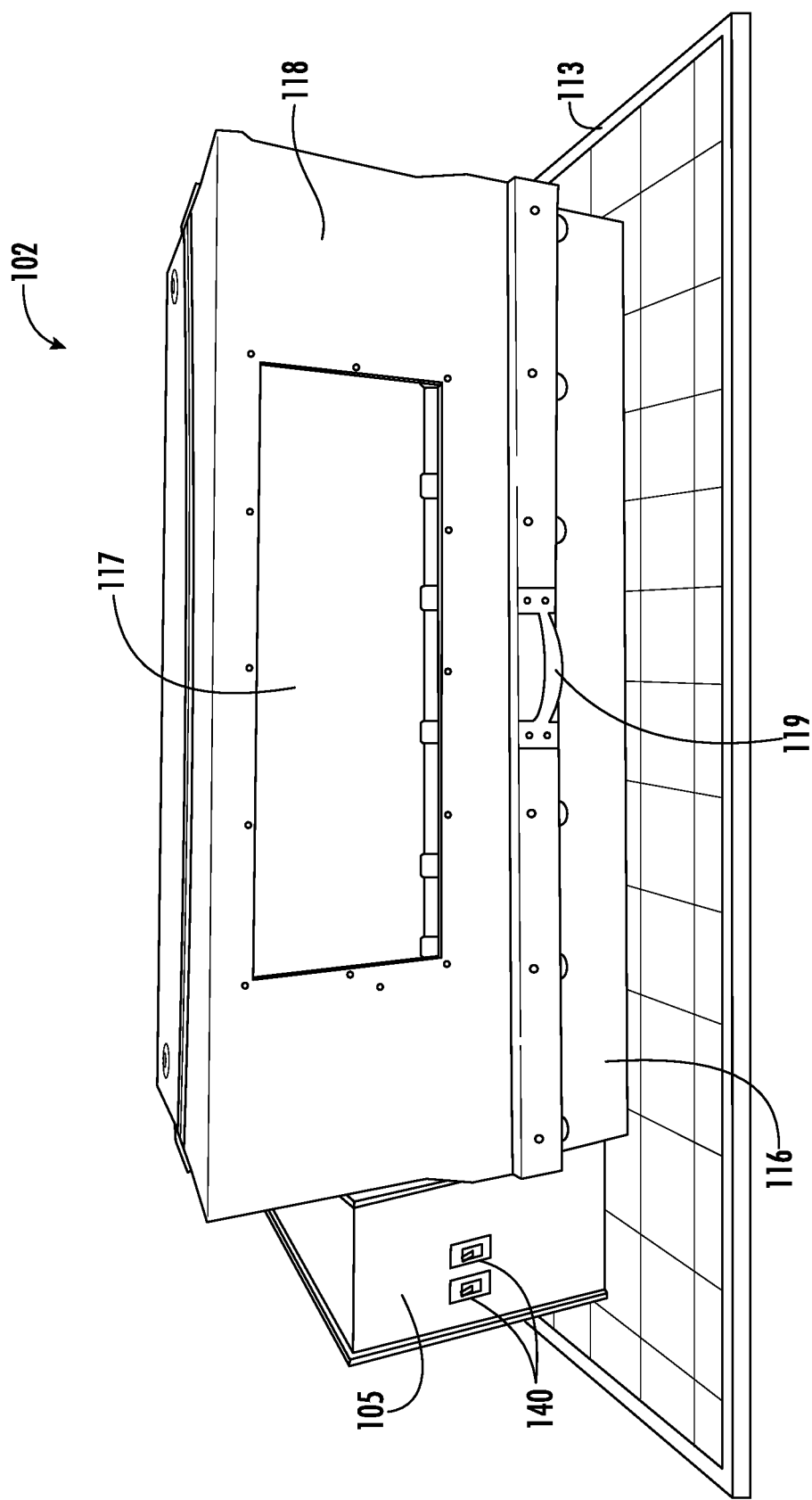
FIG. 2 is a front view of a cleaning chamber of the filter cleaning system illustrated in FIG. 1, mounted on a skid with the door of the cleaning chamber closed.
Figure 3:
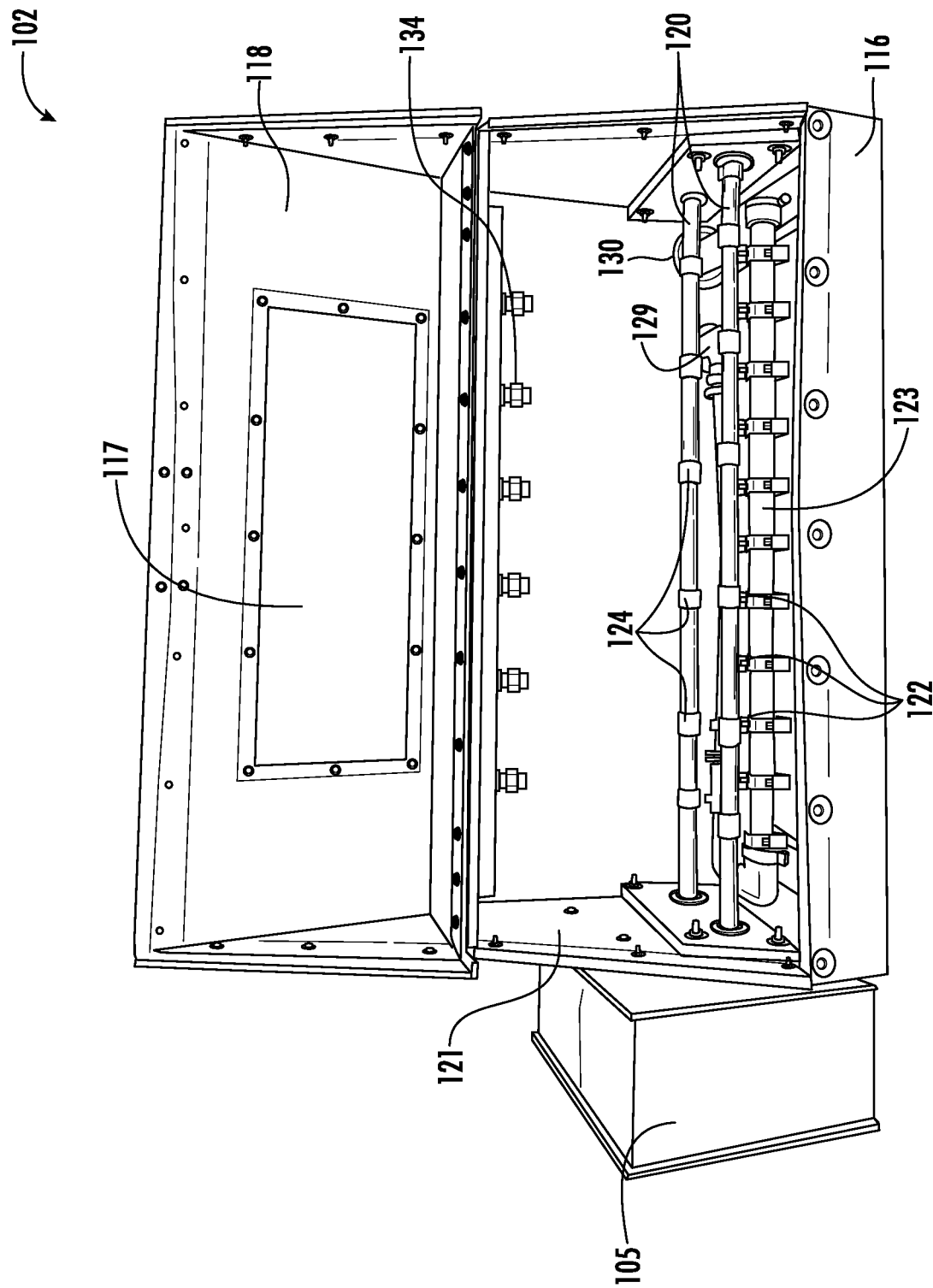
FIG. 3 is a front view of the cleaning chamber shown in FIG. 2 with the door open.
Figure 4:
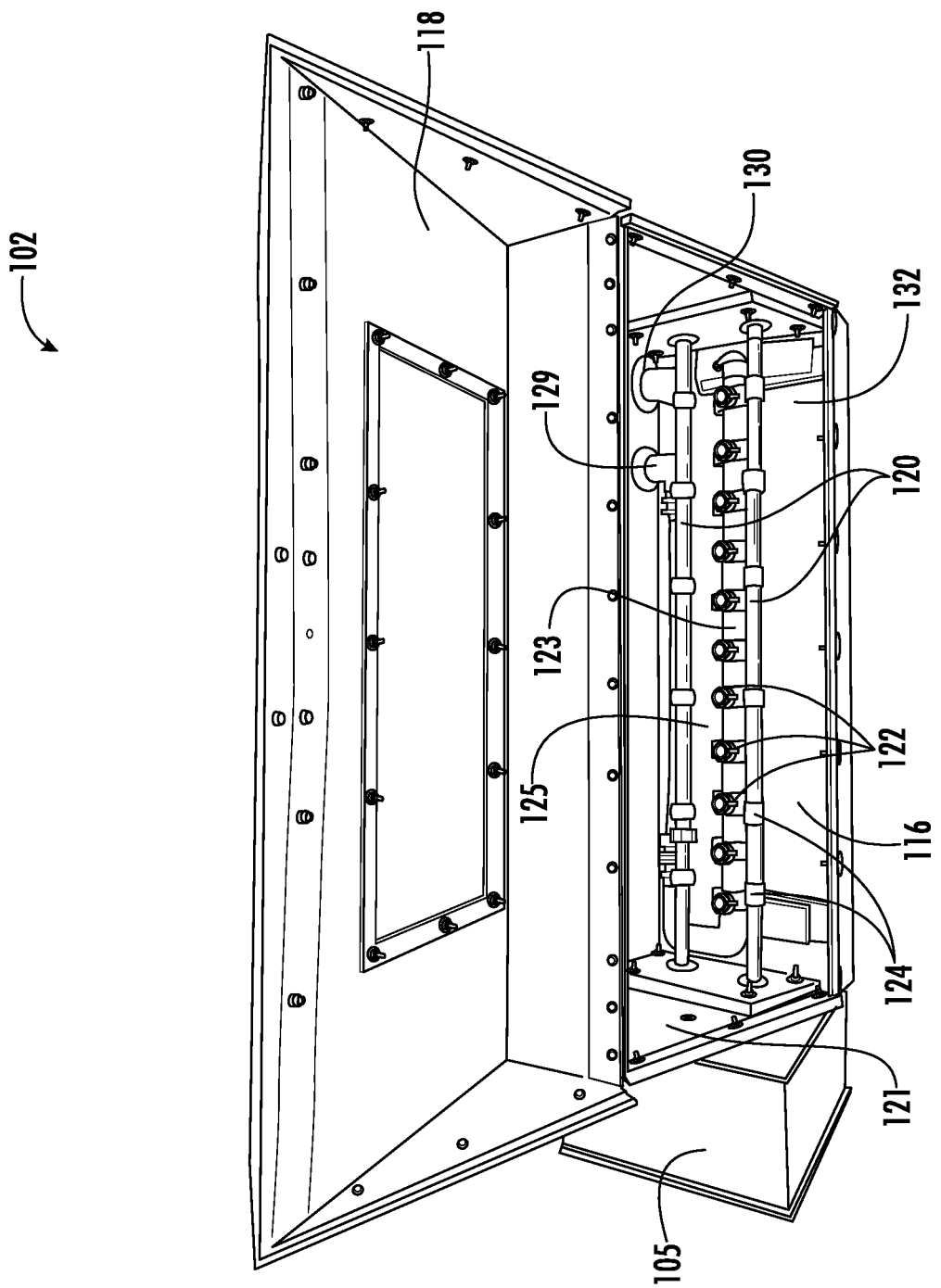
FIG. 4 is a top view of the cleaning chamber shown in FIG. 2 with the door open.

The cleaning chamber 102 may comprise a container 116 with a door 118, a plurality of shafts 120, and a plurality of nozzles 122. The door 118 may be hingedly coupled to the container 116, as shown in FIG. 2-3, or may be coupled in some other way. For example, the door 118 could also be slidably coupled to the container 116. The door 118 may have a window 117 extending through the door 118 that is configured to allow a user to see into the cleaning chamber 102 when the door 118 is closed. The door 118 may also have a handle 119 to facilitate manipulation of the door 118. The container 116 and the door 118 may together define an interior of the cleaning chamber 102. The shafts 120 extend along at least a portion of the length of the cleaning chamber 102 within the interior of the cleaning chamber 102. The shafts 120 may also extend through a wall 121 of the container 116 and into the control box 105 to operably couple with the drive motor 112 of the drive system 104. Each of the shafts 120 is rotatable with respect to the cleaning chamber 102, and together, the shafts 120 are configured to support the filter 10 inside of the cleaning chamber 102.

Figure 8:
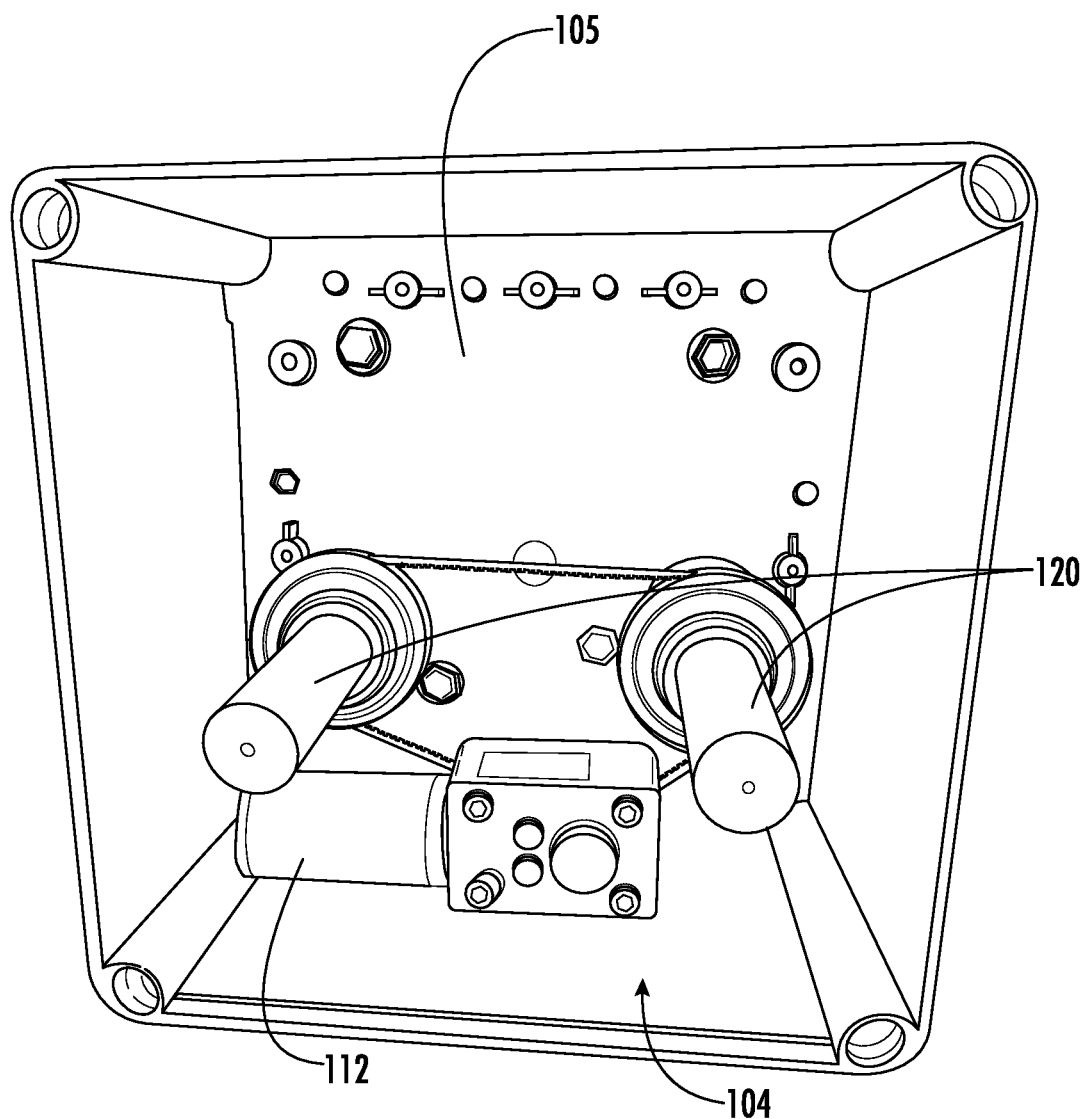
FIG. 8 is a side view of the inside of the drive box of the cleaning chamber shown in FIG. 2.

In some embodiments, the drive motor 112 may be operably coupled to at least one shaft 120 (see FIG. 8). Thus, though all of the shafts 120 may be driven, this is not required, and as few as just one shaft 120 may be driven. This may be enough to cause the filter 10 to rotate. The remaining, undriven shafts 120 may still be configured to rotate so that they do not inhibit rotation of the filter 10. Thus, the drive system 104, and the drive motor 112 in particular, may be configured to rotate the shafts 120. In some embodiments, the drive motor 112 is configured to rotate in two different directions. Thus, for example, the drive motor 112 may be configured to rotate the shaft 120 in a first direction and in a second direction. The second direction may be opposite the first direction.

Figure 6:
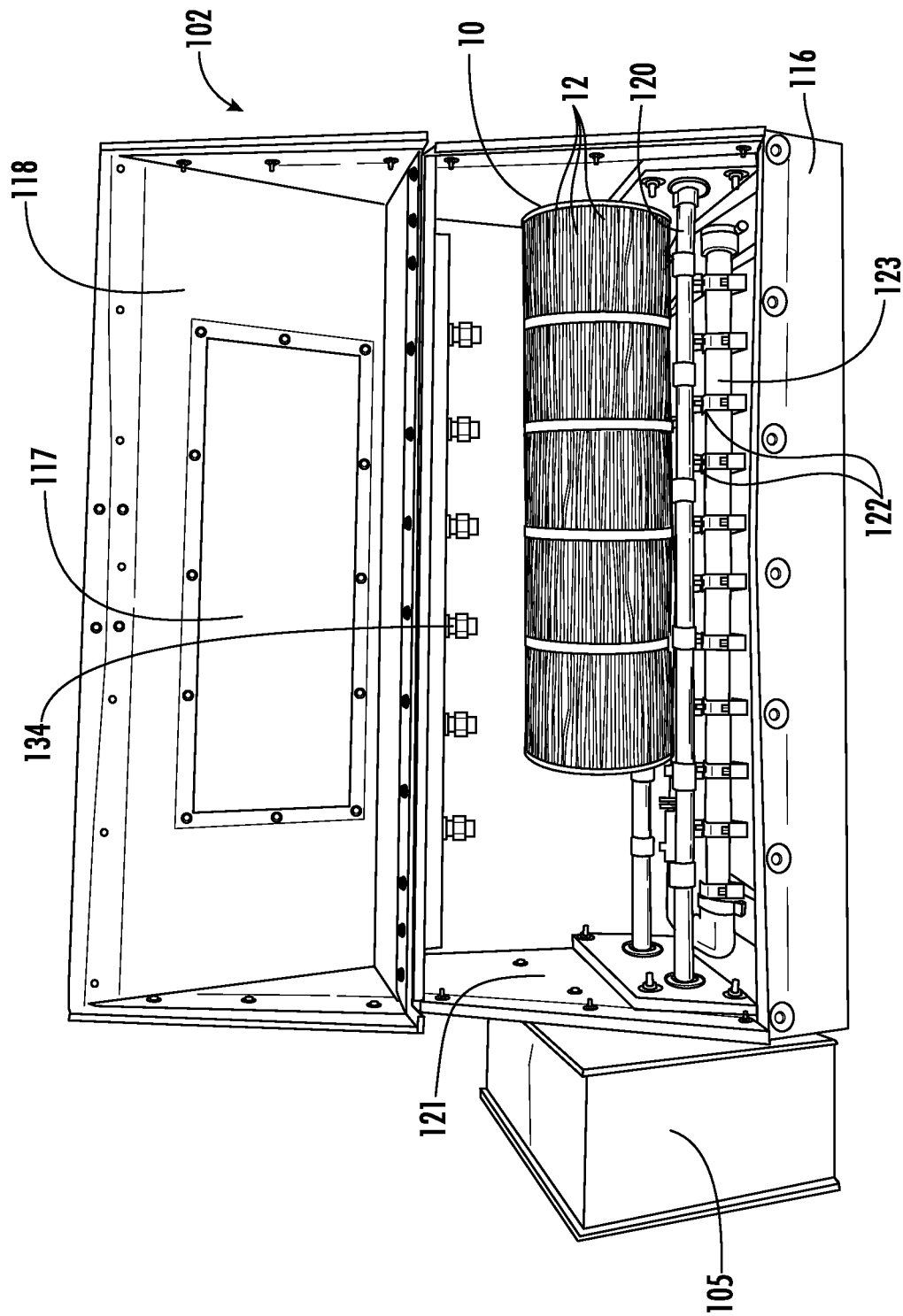
FIG. 6 is a front view of the cleaning chamber shown in FIG. 2 with a filter cartridge placed inside.

As mentioned above, the shafts 120 are rotatable with respect to the cleaning chamber 102. When the filter 10 is positioned on top of the shafts 120, as shown in FIG. 6, the shafts 120 can thus cause the filter 10 to rotate. When the shafts 120 cause the filter 10 to rotate, the filter 10 rotates about an axis of the filter 10. The shafts 120 may include at least one grip 124 that is configured to increase the friction between the shafts 120 and the filter 10 and reduce slippage between the shafts 120 and the filter 10.

Returning to FIG. 5, the nozzles 122 are also positioned within the interior of the cleaning chamber 102. Each nozzle 122 is fluidly coupled to a manifold 123 within the cleaning chamber 102. The manifold 123 is fluidly coupled to the pump 108 through an inlet 129 to the cleaning chamber 102 and is configured to receive water passed to the cleaning chamber 102 from the water holding tank 106 by the pump 108. The nozzles 122 may be positioned below the shafts 120 and may be configured to spray water upward toward a gap 125 between the shafts 120. Thus, when the filter 10 is positioned on the shafts 120 and covers the gap 125 between the shafts 120, the nozzles 122 may be configured to spray the filter 10. Having the nozzles 122 below the shafts 120 also positions the nozzles 122 below the filter 10, allowing gravity to help clean out the filter 10 as the nozzles 122 spray the filter 10.

Figure 7:
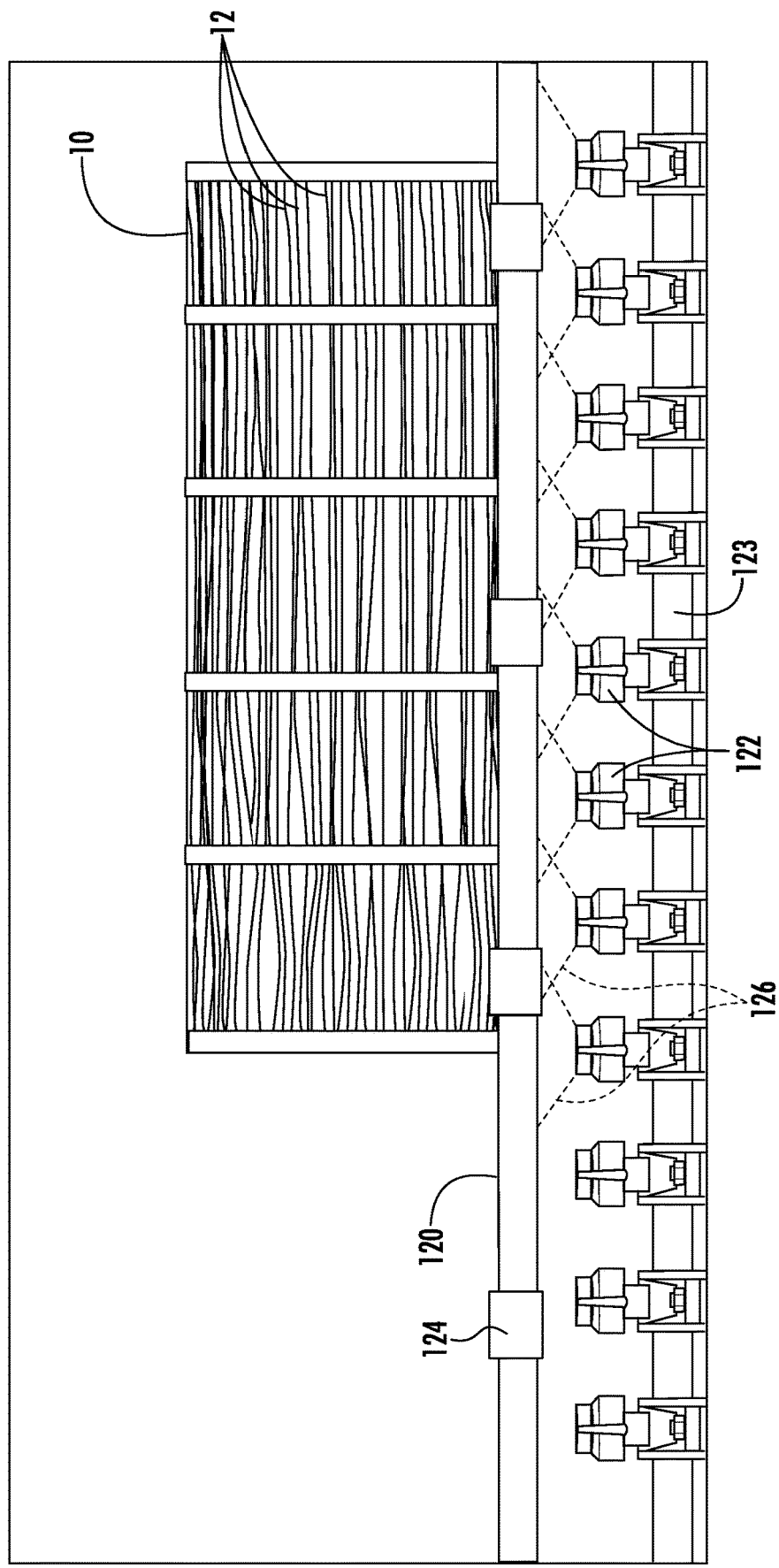
FIG. 7 is a front view of the cleaning chamber shown in FIG. 2 with a filter placed inside and the water running.

Each nozzle 122 has a spray pattern 126 created by an orifice 128 of the nozzle 122. The spray pattern 126 may be configured to open each pleat 12 of a plurality of pleats 12 of the filter 10 as the filter 10 rotates about the axis of the filter 10. Typically, getting the filter 10 cleaned inside of the pleats 12 is difficult because the material inside of the pleats 12 is not facing the direction of spray. The nozzles 122 fix this issue by spraying in a way that opens up the pleats 12, making the pleats 12 more accessible for cleaning. In some embodiments, the spray pattern 126 comprises a flat fan pattern with a centerline. By spraying in a line, the spray pattern 126 can more directly target the inside of each pleat 12. The spray pattern 126 may have a spread of at least 100 degrees along the centerline or may spray over a larger angle or a smaller angle. The spray pattern 126 may have a spread of 110 degrees in particular embodiments. The spray pattern 126 of each nozzle 122 may overlap with the spray pattern 126 of an adjacent nozzle 122 (see FIG. 7). This helps to ensure that all of the filter 10 gets cleaned.

Figure 5:
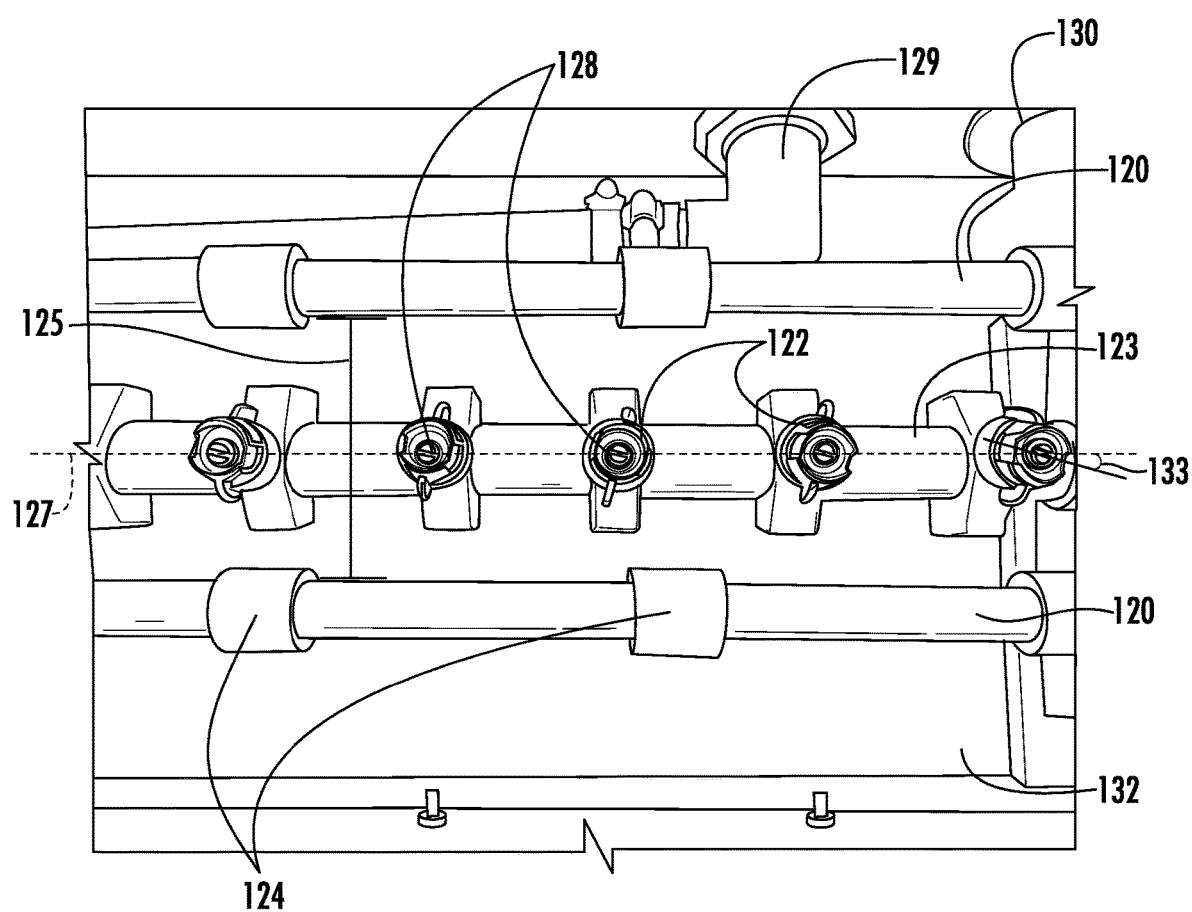
FIG. 5 is a close-up top view of the nozzles of the cleaning chamber shown in FIG. 2.

The spray pattern 126 may be created by a particular shape of the orifice 128. For example, for a flat fan pattern, the orifice 128 may be a slit as shown in FIG. 5 that keeps the spray pattern 126 narrow in one direction, but allows it to spread in the other direction. Other shapes for the orifice 128 may also be implemented to produce similar or similarly effective spray patterns 126. In embodiments where the orifice 128 is a slit, each nozzle 122 may be oriented such that the orifice 128, and therefore the centerline of the spray pattern 126, is nonparallel with the axis of the filter 10 when the filter 10 is positioned on the shafts 120. The axis of the filter 10 is generally parallel with the manifold 123. Thus, as shown in FIG. 5, to make the orifice 128 be oriented such that it is nonparallel with the axis of the filter 10, the axis 127 of the orifice 128 must be nonparallel with the manifold 123. This may help the spray pattern 126 to better open the pleats 12 of the filters 10 because the edges of the spray pattern 126 apply a sideways force to the pleats 12 to open them up. In some embodiments, the angle 133 between the axis of the filter 10 and the centerline of the spray pattern 126 is between 5 degrees and 10 degrees. However, in particular embodiments, this angle is less than or equal to 5 degrees or more than or equal to 10 degrees.

Each nozzle 122 may be individually closeable. This makes the cleaning chamber 102 adaptable to a variety of filter sizes. For filters 10 that are smaller, some of the nozzles 122 can be closed so that water is not sprayed unnecessarily through these nozzles 122 (see FIG. 7). This saves water by reducing the amount of water used when possible.

In some embodiments, the cleaning chamber 102 may have an outlet 130 adjacent to a bottom 132 of the cleaning chamber 102. The bottom 132 of the cleaning chamber 102 may be below the nozzles 122 as explained above. The outlet 130 may be configured to drain recovery water out of the interior of the cleaning chamber 102. Thus, in some embodiments, the outlet 130 is fluidly coupled to the discharge water filter 110 so that the recovery water can be passed from the cleaning chamber 102 to the discharge water filter 110. The water may also pass through the strainer basket assembly 115 prior to the discharge water filter 110. As mentioned above, in some embodiments, the filter pump 114 may also be fluidly coupled to the outlet 130 to help drain recovery water out of the cleaning chamber 102, pump the recovery water through the strainer basket assembly 115, pass the recover water to the discharge water filter 110, and discharge the recovery water from the cleaning system 100.

In particular embodiments, a float switch 131 may be incorporated into the outlet 130. The float switch 131 is configured to mechanically sense when the water level within the cleaning chamber 102 reaches a maximum level and is configured to turn on the filter pump 114 when the water level reaches this point so that the water within the cleaning chamber 102 can be drained from the cleaning chamber 102. Conversely, the float switch 131 may be configured to mechanically sense when the water level within the cleaning chamber 102 has lowered enough that the filter pump 114 cannot drain more water and turn off the filter pump 114 when the water level has lowered to this point. In this way, the filter pump 114 can be automatically engaged and disengaged as needed. However, even in embodiments with a float switch 131, the cleaning system 100 may also have a switch 140 in the control box 105 to directly turn the filter pump 114 on or off. This switch 140 may be a three-way switch between an "on" setting, and "automatic" setting that utilizes the float switch 131, and an "off" setting.

The cleaning system 100 is configured to clean a filter 10, in particular cartridge filters. A user can place the filter 10 inside of the cleaning chamber 102. The system 100 uses the pump 108 to pass water from the water holding tank 106 to the cleaning chamber 102. Within the cleaning chamber 102, the drive motor 112 rotates the shafts 120 and the shafts 120 cause the filter 10 to rotate while the water sprays upward onto the filter 10 and cleans the filter 10 with the spray pattern 126 discussed above. In some embodiments, the shafts 120 cause the filter 10 to rotate in the first direction for a complete revolution, and then the drive motor 112 can be reversed to cause the filter 10 to rotate in the second direction for a complete revolution. In another embodiment, the shafts 120 may cause the filter 10 to rotate in the first direction for a complete revolution, pause while the user flips the filter 10 end over end, and then continue in the first direction for another complete revolution. These different methods may provide additional benefits in cleaning the filter 10.

The cleaning system 100 may also comprise an applicator 134 configured to apply a chemical formulation to the filter 10 prior to cleaning (see FIGS. 3 and 6). The chemical formulation may be stored in a chemical formulation tank 136 and may be pumped to the cleaning chamber 102 and sprayed from the applicator 134 by a chemical pump 138 (see FIG. 1). As with all other components of the cleaning system 100 that require power, the chemical pump 138 may be powered by the system motor 111. The chemical formulation may be a detergent, a degreaser, or any other formulation that might be desired for cleaning the filter 10. The applicator 134 may be positioned within the cleaning chamber 102 above the shafts 120 such that the applicator 134 is positioned above the filter 10 when the filter 10 is positioned inside the cleaning chamber 102. This allows the applicator 134 to apply the chemical formulation evenly to all surfaces of the filter 10 as the filter 10 rotates. Once this chemical formulation has been applied, the filter 10 can be cleaned as described above.

The control box 105 may include any number of switches 140 to control power to each of the components of the cleaning system 100 that requires electricity to function. The switches 140 may be on an outer surface of the control box 105 as shown in FIG. 2-3, or may be included inside of the control box 105. The switches 140 could also be located at any other location on the cleaning system 100. The control box 105 may include switches 140 to control the pump 108, the drive motor 112, the filter pump 114, the float switch 131, and/or the chemical pump 138. Some of these switches 140 may be combined into a single switch 140 for multiple components, and a single component may be controlled by several switches 140. For example, there may be a switch 140 that turns on the pump 108 and the drive motor 112 so that whenever the pump 108 is on, the drive motor 112 rotates the shafts and causes the filter 10 to rotate. Similarly, there may be a switch 140 that turns on the chemical pump 138 and the drive motor 112 so that the filter 10 is rotated as the applicator 134 applies the chemical formulation.

The cleaning system 100 disclosed herein introduces time and energy savings to the process of cleaning filters 10 because the filters 10 can be cleaned much faster than is typical. For example, conventional methods for cleaning filters 10 can take up to half an hour or more per filter 10, but the same filters 10 can be cleaned much more thoroughly in just 30 seconds or 60 seconds. In addition, the cleaning system 100 saves significant amounts of water because less time is spent cleaning, and thus the water is turned on for much less time.

In some embodiments, the water pressure used by the pump 108 is important to ensure that the filter 10 is adequately cleaned. Thus, the pump 108 may be configured to supply water to the nozzles 122 from the water holding tank 106 at a water pressure of at least 80 pounds per square inch (psi). In particular embodiments, the water pressure is much higher. For example, a water pressure of at least 90 psi, at least 100 psi, at least 110 psi, at least 120 psi, at least 130 psi, at least 140 psi, and even at least 150 psi may be implemented. As the water pressure increases, less water may be needed to adequately clean the filter 10 because the water is used more effectively. This may further improve efficiency. The size of the orifices 128 may be adjusted based on the water pressure implemented and the flow rate desired.

As mentioned above, the present disclosure is also related to methods of cleaning filters 10. Such a method may comprise any of the following: placing a filter 10 on a plurality of shafts 120; rotating the filter 10 with the shafts 120; applying a chemical formulation to the filter 10; spraying the filter 10 with water from nozzles 122 positioned below the filter 10; spraying the filter 10 with a spray pattern 126; opening the pleats 12 of the filter 10 with the spray pattern 126; rotating the filter 10 through a first complete revolution; reversing the direction of rotation of the shafts 120; flipping the filter 10 over on the shafts 120; and/or rotating the filter 10 through a second complete revolution.

It will be understood that implementations of a filter cleaning system are not limited to the specific assemblies, devices and components disclosed in this document, as virtually any assemblies, devices and components consistent with the intended operation of a filter cleaning system may be used. Accordingly, for example, although particular filter cleaning systems, and other assemblies, devices and components are disclosed, such may include any shape, size, style, type, model, version, class, measurement, concentration, material, weight, quantity, and/or the like consistent with the intended operation of filter cleaning systems. Implementations are not limited to uses of any specific assemblies, devices and components; provided that the assemblies, devices and components selected are consistent with the intended operation of a filter cleaning system.

Accordingly, the components defining any filter cleaning system may be formed of any of many different types of materials or combinations thereof that can readily be formed into shaped objects provided that the materials selected are consistent with the intended operation of a filter cleaning system. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various filter cleaning systems may be manufactured using conventional procedures as added to and improved upon through the procedures described here. Some components defining a filter cleaning system may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for manufacturing or assembling filter cleaning systems are not limited to the specific order of steps as disclosed in this document. Any steps or sequence of steps of the assembly of a filter cleaning system indicated herein are given as examples of possible steps or sequence of steps and not as limitations, since various assembly processes and sequences of steps may be used to assemble filter cleaning systems.

The implementations of a filter cleaning system described are by way of example or explanation and not by way of limitation. Rather, any description relating to the foregoing is for the exemplary purposes of this disclosure, and implementations may also be used with similar results for a variety of other applications employing a filter cleaning system.

What is claimed is:
1. A filter cleaning system, comprising:
  a cleaning chamber having:
    a container with a door hingedly coupled to the container, the container and the door together defining an interior of the cleaning chamber;

a plurality of shafts in the interior of the cleaning chamber, extending along a length of the cleaning chamber, and configured to support a cylindrical filter, wherein each shaft of the plurality of shafts is rotatable with respect to the cleaning chamber and configured to cause the filter to rotate about an axis of the filter;

a plurality of nozzles positioned below the plurality of shafts in the interior of the cleaning chamber and configured to spray water upward toward a gap between the plurality of shafts, wherein each nozzle has a spray pattern comprising a flat fan pattern with a centerline, wherein each nozzle is oriented such that the centerline is nonparallel with the axis of the filter when the filter is positioned on the plurality of shafts, and wherein each nozzle of the plurality of nozzles is individually closeable; and an outlet adjacent to a bottom of the cleaning chamber below the plurality of nozzles in the interior of the cleaning chamber, the outlet configured to drain recovery water out of the interior of the cleaning chamber;

a drive system positioned outside of the cleaning chamber, the drive system having a drive motor operably coupled to and configured to rotate at least one shaft of the plurality of shafts;

a water holding tank fluidly coupled to the plurality of nozzles;

a pump configured to supply water to the plurality of nozzles from the water holding tank; and a discharge water filter fluidly coupled to the outlet of the cleaning chamber and configured to filter and discharge the recovery water from the filter cleaning system.

2. The filter cleaning system of claim 1, wherein the spray pattern of each nozzle of the plurality of nozzles overlaps with the spray pattern of an adjacent nozzle of the plurality of nozzles.

3. The filter cleaning system of claim 1, wherein, when the filter is positioned on the plurality of shafts, an angle between the axis of the filter and the centerline of the spray pattern of each nozzle is between 5 degrees and 10 degrees.

4. The filter cleaning system of claim 1, wherein the drive motor is configured to rotate the at least one shaft of the plurality of shafts in a first direction and in a second direction opposite the first direction.

5. A filter cleaning system comprising a cleaning chamber, the cleaning chamber having:
a container defining an interior of the cleaning chamber;
a plurality of shafts in the interior of the cleaning chamber, extending along a length of the cleaning chamber, and configured to support a filter, wherein each shaft of the plurality of shafts is rotatable with respect to the cleaning chamber and configured to cause the filter to rotate about an axis of the filter;
a plurality of nozzles positioned below the plurality of shafts in the interior of the cleaning chamber and configured to spray water upward toward a gap between the plurality of shafts, wherein each nozzle has a spray pattern comprising a flat fan pattern with a centerline and wherein each nozzle is oriented such that the centerline is nonparallel with the axis of the filter when the filter is positioned on the plurality of shafts; and
an outlet adjacent to a bottom of the cleaning chamber below the plurality of nozzles in the interior of the cleaning chamber, the outlet configured to drain recovery water out of the interior of the cleaning chamber.

6. The filter cleaning system of claim 5, wherein each nozzle of the plurality of nozzles is individually closeable.

7. The filter cleaning system of claim 5, further comprising a drive system positioned outside of the cleaning chamber, the drive system having a drive motor operably coupled to and configured to rotate at least one shaft of the plurality of shafts in a first direction and in a second direction opposite the first direction.

8. The filter cleaning system of claim 5, further comprising a water holding tank fluidly coupled to the plurality of nozzles and a pump configured to supply water to the plurality of nozzles from the water holding tank at a water pressure of at least 80 pounds per square inch.

9. The filter cleaning system of claim 5, wherein, when the filter is positioned on the plurality of shafts, an angle between the axis of the filter and the centerline of the spray pattern of each nozzle is between 5 degrees and 10 degrees.

10. The filter cleaning system of claim 5, wherein the spray pattern of each nozzle of the plurality of nozzles has a spread of at least 100 degrees along the centerline.

11. A filter cleaning system comprising:
a plurality of shafts configured to support a filter, wherein each shaft of the plurality of shafts is rotatable and is configured to cause the filter to rotate about an axis of the filter; and
a plurality of nozzles positioned below the plurality of shafts and configured to spray water upward toward a gap between the plurality of shafts, wherein each nozzle has a spray pattern configured to open each pleat of a plurality of pleats of the filter as the filter rotates about the axis of the filter.

12. The filter cleaning system of claim 11, further comprising a cleaning chamber having a container and a door coupled to the container, wherein the plurality of shafts and the plurality of nozzles are positioned within an interior of the cleaning chamber defined by the container and the door.

13. The filter cleaning system of claim 12, further comprising a filter fluidly coupled to an outlet of the cleaning chamber and configured to filter and discharge the recovery water from the filter cleaning system.

14. The filter cleaning system of claim 11, wherein each nozzle of the plurality of nozzles is individually closeable.

15. The filter cleaning system of claim 11, further comprising a drive system having a drive motor operably coupled to and configured to rotate at least one shaft of the plurality of shafts.

16. The filter cleaning system of claim 15, wherein the drive motor is configured to rotate the at least one shaft of the plurality of shafts in a first direction and in a second direction opposite the first direction.

17. The filter cleaning system of claim 11, wherein the spray pattern of each nozzle of the plurality of nozzles overlaps with the spray pattern of an adjacent nozzle of the plurality of nozzles.

18. The filter cleaning system of claim 11, wherein the spray pattern of each nozzle comprises a flat fan pattern with a centerline.

19. The filter cleaning system of claim 18, wherein each nozzle is oriented such that the centerline is nonparallel with the axis of the filter when the filter is positioned on the plurality of shafts.

20. The filter cleaning system of claim 18, wherein, when the filter is positioned on the plurality of shafts, an angle between the axis of the filter and the centerline of the spray pattern of each nozzle is between 5 degrees and 10 degrees.

* * * * *